United States Patent
Schmidt, Jr. et al.

[19]

[11] Patent Number: 6,104,970
[45] Date of Patent: Aug. 15, 2000

[54] CRAWLER INSPECTION VEHICLE WITH PRECISE MAPPING CAPABILITY

[75] Inventors: Karl F. Schmidt, Jr., Lumberville, Pa.; Tagore Somers, Houston, Tex.

[73] Assignee: Raytheon Company, Lexington, Mass.

[21] Appl. No.: 09/024,954

[22] Filed: Feb. 17, 1998

[51] Int. Cl.[7] .............................. G06F 17/00; G06F 7/00
[52] U.S. Cl. ............................. 701/2; 701/31; 73/1.22; 73/291; 73/693
[58] Field of Search ............................. 701/2, 10, 21, 701/29, 31, 33, 200, 211; 73/1.22, 40.5 A, 623, 290 R, 291; 376/310, 316; 15/339

[56] References Cited

U.S. PATENT DOCUMENTS

| | | | |
|---|---|---|---|
| 4,821,665 | 4/1989 | Matthias et al. | 114/222 |
| 4,850,669 | 7/1989 | Welker et al. | 385/75 |
| 4,896,528 | 1/1990 | Lewis | 73/40.7 |
| 5,205,174 | 4/1993 | Silverman et al. | 73/623 |
| 5,363,935 | 11/1994 | Schempf et al. | 180/9.1 |
| 5,435,405 | 7/1995 | Schempf et al. | 180/9.1 |
| 5,514,956 | 5/1996 | Maxfield et al. | 324/262 |
| 5,614,825 | 3/1997 | Maxfield et al. | 324/242 |

OTHER PUBLICATIONS

On Stream Inspection of AST Floors, Tagore Somers, International.
Design of a Fuel Tank Inspectionrov: Tagore Somers, Marine.
Raytheon Engineers and Constructors: Jun. 1998 Calendar.

*Primary Examiner*—William A. Cuchlinski, Jr.
*Assistant Examiner*—Gertrude Arthur
*Attorney, Agent, or Firm*—Daly, Crowley & Mofford, LLP

[57] ABSTRACT

A crawler vehicle for inspection of the floor of a tank partially filled with a liquid includes telemetry carried by a tether between the vehicle and the remote station for communication of data and control signals between the vehicle and personnel within the station. The vehicle carries a Hall-effect sensor to sense anomalies in a magnetic flux outside the plate resulting from pitting within the plate. An array of ultrasonic transducer probes provides a detailed picture of the defect. A proximity sensor determines the presence of a step abutment between contiguous plates to command for a retraction of the magnet to prevent collision with the step abutment. A pressure sensor measures the depth between the vehicle and a planar surface of the liquid, used as a reference plane, to determine a degree of flatness of the floor and the presence of any settling of the floor. Shaft-angle encoders on a drive wheel and steering mechanism provide for accurate dead reckoning for the position of the vehicle, particularly during repetitive backing up movements of the vehicle. The data gathered by the various sensors is integrated to generate an accurate map of the tank floor for assessing need for further inspection and/or repair.

14 Claims, 8 Drawing Sheets

CRAWLER INSPECTION VEHICLE WITH PRECISE MAPPING CAPABILITY

BACKGROUND OF THE INVENTION

This invention relates to a crawler vehicle and a data processing system wherein the crawler crawls along the floor of a tank containing a liquid for inspection of the integrity of the floor of the tank and, more particularly, to the provision of the crawler with coarse and fine data gathering capability suitable for a precise mapping of a tank floor.

Tank farms have numerous tanks situated above ground for holding various types of liquid ranging from volatile combustible hydrocarbons, such as gasoline or other explosive material, to non-hazardous liquid substances such as water-based food products. With the passage of time, the floor of the tank may corrode from the inside and/or the outside, and exhibit pitting and cracking. Such forms of corrosion introduce a weakness to the floor of the tank with the possibility of a leak in the tank. To insure the integrity of the tank, it is the practice to conduct periodic inspections of the tank so as to detect signs of wear well before a failure occurs, and also to predict a rate of degradation of the tank floor for assessing an appropriate schedule for periodic inspection.

A problem arises in that tank inspection procedures are often accomplished by taking the tank out of service, opening up a passage in a sidewall of the tank, venting the tank of all possible hazardous vapors, and then allowing personnel to enter the tank for conducting the inspection. Typically, in the conduct of the inspection, it is the practice to clean sediment from the floor of the tank, thereby to expose numerous portions of the floor whereupon electromagnetic or acoustic sounding devices can be employed for supplementing visual observation of the floor by determining the thickness of the floor and anomalies due to pitting and cracking.

It is recognized that, in the case of periodic inspection, it is desirable to reinspect the same locations which have been inspected previously, thereby to enable a comparison of conditions over a number of inspections for determining a rate of degradation. This requires some form of mapping procedure to insure that the same areas are being inspected each time. Thus, there is a further problem in that there is a need for precise mapping apparatus which is not presently available. In the case of inspection of tanks containing fossil fuels, such as petroleum, the venting of the noxious fumes as well as other procedures of the inspection are carried out in accordance with API 653 recommended practice for maintenance.

SUMMARY OF THE INVENTION

The aforementioned problems are overcome and other advantages are provided by an automated inspection crawler vehicle having both ultrasonic and electromagnetic sensors, plus a telemetry system for communicating with a remote station. The remote station enables personnel to control movement of the vehicle at a safe distance from the tank without taking the tank out of service, such as by draining the tank. A navigation system of acoustic pingers and sonic receivers provides present location and orientation of the vehicle. In addition, at the remote station, a relatively large computer, or a system of smaller computers, evaluates the data, and operates with the vehicle location data in a mapping system to provide a precise map of at least a portion of the enclosing wall of the tank, in particular, the tank floor. The map enables future inspections to be carried out with observation of the very same regions of the floor during successive inspections for establishing rates of corrosion.

Communication between the computer and the vehicle is accomplished by means of the telemetry system wherein the telemetry system includes a tether of the vehicle. The tether has multiple fiber optic communication links by which data for various functions in the operation of the vehicle can be communicated between the vehicle and the computer. Both the tether and the vehicle are pressurized with nitrogen to prevent ingress of combustible fumes and any oxygen which may be mixed with the fumes. The tether extends from the back end of the vehicle and is employed for lowering and for lifting the vehicle via a manhole within the top of the tank by means of a winch. Included as part of the telemetry system are suitable transmitters and receivers located at both ends of the tether for transmission and reception of signals from the various dedicated fibers of the fiber optic transmission system.

To implement the navigation system, the vehicle is provided with at least two pingers which operate with a set of receivers mounted outside the tank on a wall of the tank. The use of a single pinger in conjunction with the receivers enables determination of present location of the pinger and, hence, of the vehicle, as well as start point of an inspection, relative to the tank. The location is determined by well-known triangulation procedures for navigating the vehicle within the tank. The orientation of the vehicle and, hence, the precise location of each instrument on the vehicle, can be determined by locating each of the plurality of the pingers. By storing previously determined positions of the vehicle at which there have been samplings of the tank floor, a map of the tank floor is obtained, the map having data of the floor obtained by sensors on the vehicle. Triggering of an acoustic ping and analysis of received signals is accomplished by the computer at the remote station, the computer being programmed to continually update the position of the vehicle to generate the map of the floor of the tank.

The mapping process, as well as navigating by use of a prior map, must compensate for the dependency of the speed of sound on the temperature of the medium through which the pinging sounds propagate. As an aid to the navigation, and to provide for precise position data of the vehicle in the situation wherein the vehicle is to make repetitive measurements by repetitive passes over a designated region of the tank floor, the vehicle is provided, in a preferred embodiment, with a shaft-angle encoder on the front wheel of the vehicle as well as a shaft anole encoder on a steering mechanism of the front wheel of the vehicle. If desired, additional encoders may be provided on other ones of the wheels. The encoders enable the veneration of dead reckoning information of the vehicle position, which information is combined at the computer with the start point and the end point of a scan, the start point and the end point being obtained from navigation data obtained from the pingers for a precise locating of the vehicle, and production of the map.

Also, the vehicle is provided with a video camera which transmits pictures of the interior of the tank to personnel at the remote station, the video showing submerged objects such as a pipe or ladder which must be avoided during movement of the vehicle. The personnel communicate speed and direction commands via the communication links of the tether to motors on the vehicle to move the vehicle about the tank for inspection of designated areas and for avoidance of the obstacles.

In accordance with a feature of the invention, the vehicle carries a device for sensing physical features of the tank floor by use of a magnetic or electromagnetic field. The device, in a preferred embodiment of the invention, is a magnetic flux leakage sensor which, in a preferred embodiment of the invention, comprises an assembly of an array of Hall-effect transducers which serve as sensors. Also provided is an array of permanent magnets which apply magnetic fields directly beneath the sensor. The Hall-effect transducers provide multiple independent measurements concurrently, and can operate even with the vehicle standing still. Alternatively, passive coils may be employed, in which case, movement of the vehicle provides for changes in magnetic flux intensity for production of an electric signal within the coils.

The plates in the floor of the tank are constructed of a metal, typically iron, which is permeable to a magnetic field. The magnets impart a strong magnetic field to the metal plate of the tank floor directly beneath the sensor. A portion of the flux of the magnetic field is present also outside of the floor plates in the vicinity of the floor to be measured by the Hall-effect sensor. A decrease in the thickness of a plate of the floor increases the resistance to the flow of the magnetic field and forces some of the field outside of the plate in the vicinity of the sensor. Such decrease in the thickness may be due to corrosion, pitting or rupture. The array of Hall-effect transducers, by being sensitive to variations in the magnetic field strength, alerts personnel at the remote station, via the telemetry link, to the presence of an anomaly in the magnetic flux.

By way of example, a linear array of 16 Hall-effect transducers extending over a distance of approximately 3.2 inches transversely to a path of travel of the vehicle provides sufficient resolution and a sufficient number of data points for the describing the anomaly in the flux. The anomaly in the flux may be displayed to personnel at the control station for interpretation and, furthermore, may be analyzed by the computer by matching to previously stored patterns of possible anomalies. The nature of the defect in the plate, which defect has been signaled by the flux anomaly, requires further examination by ultrasonic sensor to determine the configuration and nature of the defect.

To obtain the more detailed picture of the defective region in the floor plate, the vehicle also carries an ultrasonic sensor comprising an array of ultrasonic transducers. Each of the transducers is configured as a probe for sensing a specified region, such as one half inch by one half inch, beneath the vehicle. The transducers are operative to sense reflections from both front and back surfaces of the plate, wherein differences in the round-trip propagation times of the respective acoustic signals of the respective transducers are measures of the depth of the plate at the respective locations of the respective transducers. Thereby, the diminished depth at a pit in either the interior or exterior surface of the plate is noted by one or more of the transducers. In the preferred embodiment of the invention, by way of example, the ultrasonic sensor comprises an array of two interleaved rows of transducers extending over a distance, by way of example, of four inches in a direction transverse to the travel path of the vehicle. Each of the rows has five ultrasonic transducers. The ultrasonic transducers provide multiple independent measurements concurrently.

The array of the ultrasonic transducers provides sufficient resolution and a sufficient number of data points, upon movement of the vehicle, to describe the physical characteristics of the defect. For still further data of the defective portion of the plate, the vehicle may back up to make further passes across the defective region, or may make passes in various directions, wherein the computer maintains a record of the location of each sample point taken by each of the ultrasonic transducers. The locations of the sample points are set forth in the foregoing map. Thereby, the vehicle provides for a two-step process of interpretation of a flux anomaly and of sonic echoes to obtain a detailed picture of a plate defect. Signals of the flux leakage sensor and the ultrasonic sensor are transmitted by the telemetry to the remote station for presentation of a picture of the defect to the operating personnel.

The assembly of the permanent magnet and the array of the Hall-effect transducers is disposed in a well in the outer surface of the hull of the vehicle to insure integrity of the hull, thereby to prevent ingress of flammable liquid which may be contained within the tank. The assembly is carried by a positioning mechanism which advances the assembly towards the floor plate to accomplish a measurement of flux, and retracts the magnet in the event an obstacle is met, such as the abutment between two contiguous plates of the floor. The assembly must be raised from the floor in order to avoid striking the abutment. In order to have this accomplished automatically, the vehicle carries a proximity sensor electromagnetically coupled to the floor plates, and comprising a detector of an eddy current field. The field changes in the presence of the step abutment, this change being used to signal the carrier of the magnetic sensor to retract the magnetic sensor assembly from the floor.

To measure any settling which may be present in a floor plate, the vehicle carries a depth sensor which measures hydrostatic pressure to give the distance from the vehicle to the surface of the liquid in the tank. The liquid surface is a horizontal plane serving as a reference surface. By sending successive measurements of depth to the computer, via the telemetry link, and by recording the vehicle locations by the navigation system and/or by dead-reckoning with the shaft angle encoders, the computer maps the depth of the vehicle to determine that the surface of the floor has a planar form. By this mapping process, the computer determines whether there is present an undulation of the surface from the planar form, which undulation is an indication of settling. The mapping shows the location of the settling. All of the foregoing data is employed by the computer to give a precise map of conditions of the tank floor. Upon successive inspections of the tank floor, and with reference to previously obtained maps of the tank floor, rates of degradation and future inspection schedule can be determined, as well as a determination for immediate shutdown and repair of the tank.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
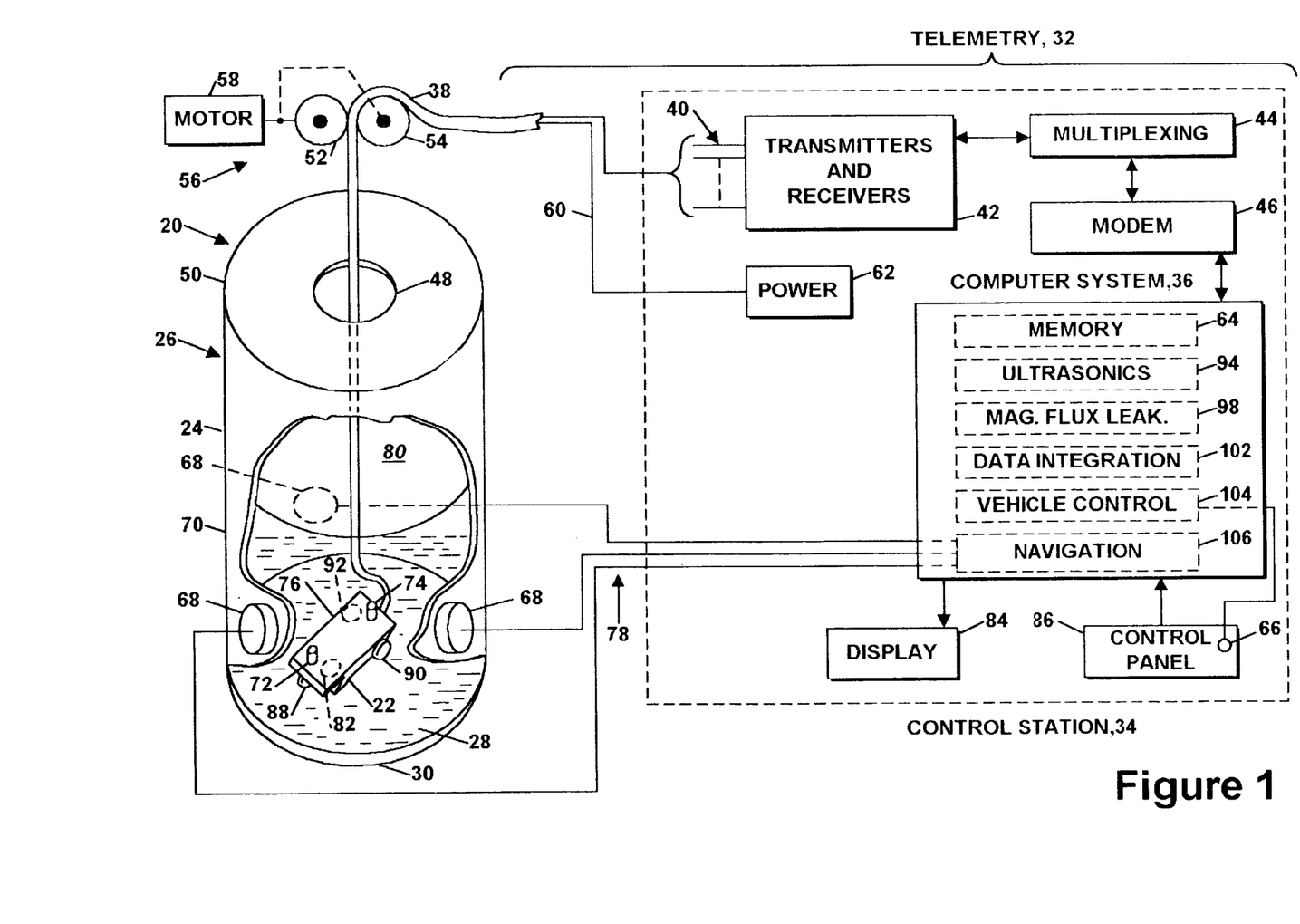
FIG. 1 is a stylized view, partially diagrammatic, of a vehicle carrying sensors, in accordance with the invention, along the bottom of the tank, and communicating via telemetry with a remote control station, a portion of the tank being cutaway to show the vehicle.

In FIG. 1, a tank inspection system 20 is constructed in accordance with the invention and comprises a vehicle 22 which crawls along a part of an enclosing wall 24 of a tank 26 which stores a liquid 28. In the preferred embodiment of the invention, the vehicle 22 crawls along the floor 30 of the tank 26. The vehicle 22 connects via a telemetry link 32 to a control station 34 having a computer system 36 for control of the vehicle 22 and for obtaining data from sensors carried by the vehicle 22. The control station 34 is located remote from the tank 26, and is operated by personnel who are informed completely about the location of the vehicle 22 and of the data being gathered by the vehicle 22 without the need for the personnel to enter the tank 26.

The telemetry link 32 comprises a tether 38 having numerous communication channels 40 therein. The telemetry link 32 further comprises transmitters and receivers at unit 42, a multiplexing unit 44 and a modem 46, wherein various ones of the transmitters and receivers of unit 42 connect with respective ones of the communication channels 40, and wherein the signals of the various channels can be multiplexed for communication with the computer system 36. One end of the telemetry link 32 connects with the vehicle 22 by the tether 38, and the other end of the telemetry link 32 connects via the modem 46 with the computer system 36.

The tether 38 serves also for lowering the vehicle 22 through a port 48, such as a manhole, in the top 50 of the tank 26 to initiate inspection of the tank 26, and serves also for retrieving the vehicle 22 at the conclusion of an inspection of the tank 26. To accomplish the lowering and raising of the vehicle 22, the tether 38 passes through sheaves 52 and 54 of a winch 56 driven by a motor 58. Energization of the motor 58 is accomplished by personnel (not shown) at the control station 34. In the preferred embodiment of the invention, the tether 38 and the vehicle 22 are pressurized with a gas such as nitrogen which does not support combustion, thereby to enable the tether 38 and the vehicle 22 to be employed in the situation wherein the liquid 28 is flammable.

The construction of a tether, such as a tether 38, with the capacity to be employed safely within a flammable or combustive environment is well known, and need not be described here in further detail. In the preferred embodiment of the invention, optical fibers are employed for respective ones of the communication channels 40. Also included within the tether 38 are power lines 60 connecting with the control station 34 for operation of various subsystems on board the vehicle 22, as well as for driving the vehicle 22 along the floor 30 of the tank 26. The power line 60 receives power from a source of power 62 within the control station 34.

The computer system 36 is provided with a memory 64 for storing samples of data provided by sensors on board the vehicle 22, and is further provided with programming to perform a mapping of the floor 30 based on samples of data stored within the memory 64. The computer system 36 includes programming for correlating one map obtained at an early date with a second map obtained at a later date for evaluating changes in a specific area of the floor 30. The computer system 36 also provides the functions of vehicular control in response to a desired input at 66 provided by operating personnel in the control station 34. In addition, the computer system 36 provides the function of navigation with the aid of signals provided by preferably three or more ultrasonic receivers 68 disposed about the exterior of the tank 26 and mounted to the side 70 of the enclosing wall 24. The navigation is accomplished also with the aid of two or more pingers, of which two pingers are employed in the preferred embodiment of the invention, namely, a front pinger 72 and a back pinger 74 mounted on the top 76 of the vehicle 22. The sounds transmitted by the respective pingers are to be distinguished form each other as by carrier frequency, modulation, or times of transmission. In the preferred embodiment of the invention, the pingers 72 and 74 are operated sequentially to generate sounds which are received by the receivers 68. By the sequential operation of the pingers 72 and 74, the sound generated by the pinger 72 is distinguished from the sound generated by the pinger 74.

In the navigation mode, the computer system 36 is operative to employ well-known triangulation procedures to evaluate the differences in transmission times between the signals of the pingers received at respective ones of the receivers 68, thereby to obtain the position of the vehicle 22 relative to the receivers 68. The computer system 36, in one embodiment of the invention, generates a timing signal which activates the pingers 72 and 74 to produce their respective sounds. Alternatively, a local clock may be employed in one of the pincer circuits for clocking the respective operations of the pingers 72 and 74. It is noted also that, due to the spacing between the pingers 72 and 74, the location of the front pinger 72 differs from the location of the back pinger 74. This difference in location enables the computer system 36 to determine the orientation of the vehicle 22 for personnel at the control station 34. The signals of the respective receivers 68 are gathered via cables 78, separate from the tether 38, and are applied to the unit 42 of the transmitters and the receivers.

A further aspect of the navigation function is the gathering of data in three dimensions, namely, the two dimensions of the foregoing locating of the vehicle 22 on the floor 30, and also a measurement of the depth of the vehicle 22 from the flat planar surface 80 of the liquid 28. This is accomplished with the aid of a pressure sensor 82 mounted on the top 76 of the vehicle 22. The depth is proportional to the hydrostatic pressure, whereby the pressure measurement is readily converted to a depth measurement. In the mapping function, the computer system 36 plots the depth of various locations along the floor 30 to determine that the floor 30 has a planar surface, and to observe any deviations from the planar configuration, such deviations being representative of a possible settling of the floor 30. Locations of the settling are noted in accordance with the foregoing mapping procedure.

Information provided from the sensors and computed by the computer system 36 is presented on a display 84 at the control station 34. Commands for operation of the vehicle 22 and its sensors, including the vehicular control input at 66, are provided by a control panel 86 at the control station 34. Also shown in FIG. 1. for the vehicle 22, are a front driving wheel 88 by which the vehicle 22 is steered, and two rear driving wheels 90 and 92 which power the vehicle, jointly with the front driving wheel 88, to move forward or backwards.

Figures 3, 3A, 4:
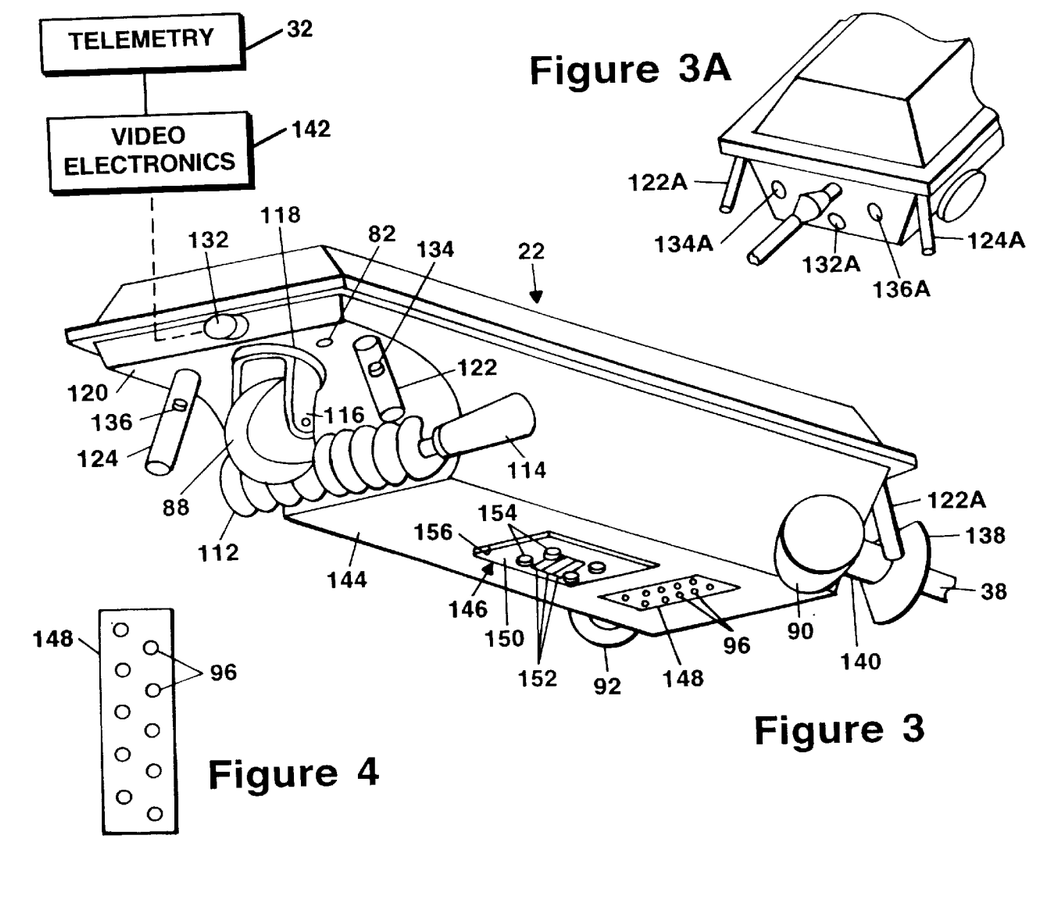
FIG. 3 shows the front and the under side of the vehicle of FIG 1.
FIG. 3A is a fragmentary view showing the back side of the vehicle of FIG. 1.
FIG. 4 shows, diagrammatically, a plan view of an array of ultrasonic probes of FIG. 3.

The vehicle 22 carries electromagnetic and ultrasonic sensing equipment for measurement of thickness of the floor 30, as will be described hereinafter. As a safety feature in the operation of the vehicle 22, the electromagnetic and the ultrasonic sensing equipment are activated by the computer system 36 upon a signaling of a nonzero value of depth by the pressure sensor 82 (FIG. 3). This indicates that the vehicle 22 and its sensing equipment are submerged. The submersion of the vehicle within the liquid 28 guards against contact of electronic equipment with flammable vapors of the liquid which may include oxygen. Such a mix of vapors might be ignited by a hot spot in the electronic equipment. The oxygen is not present in the liquid, so that submersion in the liquid protects against such ignition. It is noted also that the reception of sound from the pingers 72 and 74 is indicative of the submersion of the vehicle 22 within the liquid, and may be used as a backup indication that the vehicle 22 is submerged, so that it is safe to operate the electronic equipment. This is advantageous in the inspection of a tank containing petroleum products or other flammable liquids wherein it is desirable to exclude flammable vapors from any hot spots which may be present in the electronic equipment, thereby to insure against any fire or explosion.

The computer system 36 may be constructed as a single relatively large computer, or may be constructed of a plurality of relatively small computers. In the construction of the preferred embodiment of the invention, it has been found convenient to employ separate computers forming parts of the system 36. These component computers of the system 36 include a computer 94 for processing data obtained from a set of ultrasonic transducer probes 96 (to be described with reference to FIGS. 3 and 4), a computer 98 for processing data for magnetic flux leakage obtained from a set of magnetic flux leakage detectors 100 (to be described with reference to FIGS. 5 and 6), a computer 102 for integration of data obtained from the ultrasonic probes 96 and the flux leakage detectors 100, a computer 104 for processing signals employed in the control of movement of the vehicle 22, and a computer 106 coupled via the cables 78 to the ultrasonic receivers 68 for measurement of location of the vehicle 22 by processing of sonic signals received from the pingers 72 and 74 at the receivers 68.

It is noted that the various computers 94, 98, 102, 104, and 106 cooperate with each other for mapping the tank floor 30 to provide images of any defects which may be present in the tank floor. Thus, the magnetic flux leakage accurately signals the location of a defect based on an anomaly in the detected flux leakage, but without providing any specific data as to the configuration of the defect. The ultrasonic signals processed by the computer 94 identify the nature of pitting, including a geometric configuration of such pitting, for the defect discovered by the magnetic flux leakage.

Data from the flux leakage and the ultrasonics are correlated within the data integration computer 102 along with data taken from further inspection passes of the vehicle 22 to provide an enhanced image of a defect. The successive passes of the vehicle 22 in an inspection scan of the floor 30 are implemented with position data of the vehicle 22 obtained by shaft angle encoders for steering and displacement respectively, of the vehicle 22 (to be described hereinafter with reference to FIG. 7) thereby to accomplish registration of the various images produced during successive passes of the vehicle 22 over a defect being inspected. The starting point of a scan is noted by use of data obtained from the navigation computer 106. Subsequent precision displacement of the vehicle 22 in two dimensions is obtained with the aid of the encoder data processed by the vehicle control computer 104.

Figure 2:
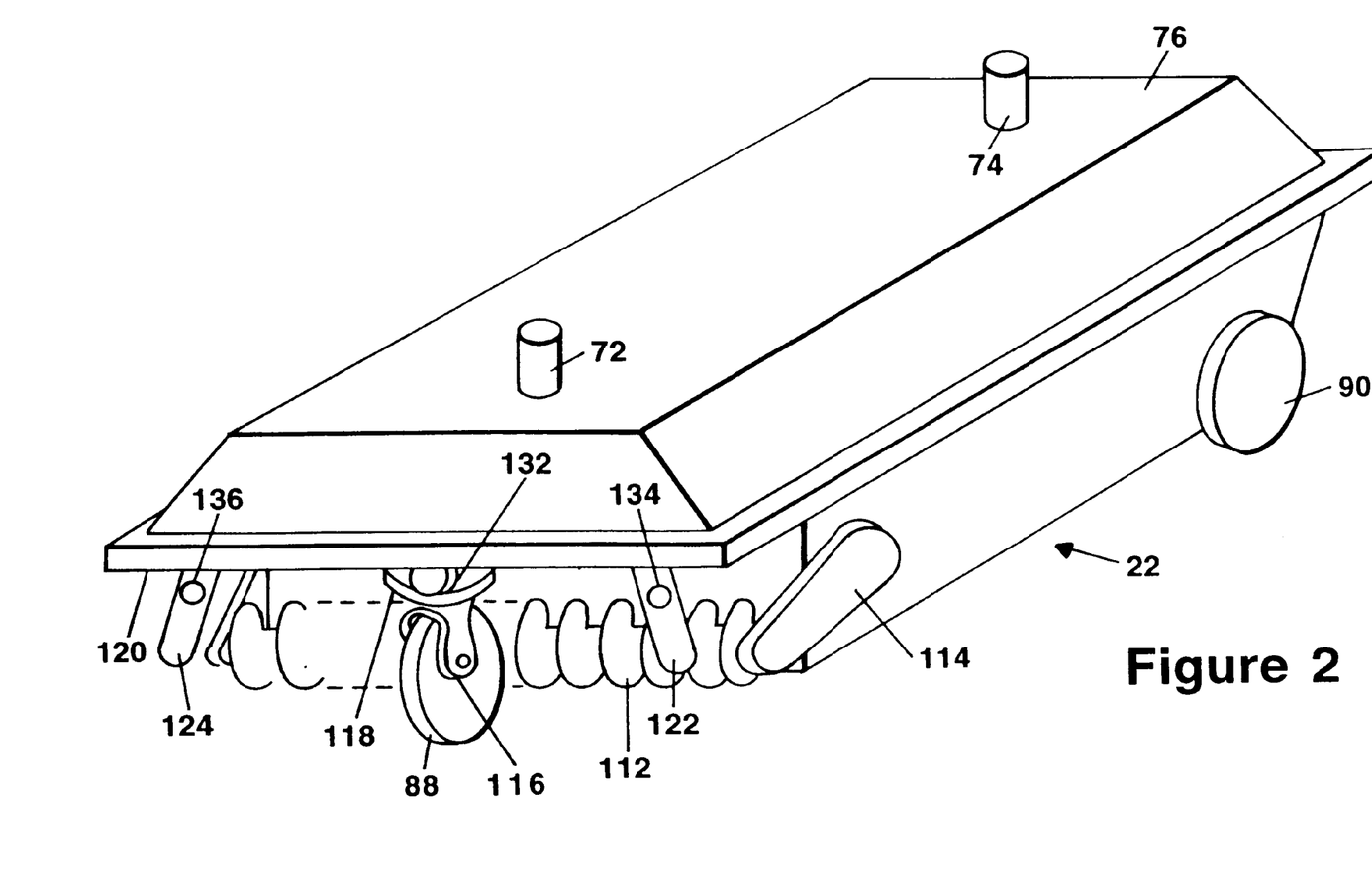
FIG. 2 is a stylized isometric view of the vehicle of FIG. 1.

With reference to FIGS. 2 and 3, the vehicle 22 comprises a brush 112 comprising metallic bristles arranged generally in a spiral about a longitudinal axis of the brush 112. The brush 112 extends laterally of the vehicle 22, is located at the forward end of the vehicle 22 behind the front wheel 88, and is rotated about its longitudinal axis by a motorized drive 114 for cleaning a surface of the floor 30 (FIG. 1) during forward travel of the vehicle 22 along the floor 30. The front driving wheel 88 is supported by a bracket 116 extending from a steering mechanism 118. The steering mechanism 118 serves to rotate the front driving wheel 88 about a vertical steering axis extending from an overhang 120 of the vehicle 22. The overhang 120 also serves to carry a viewing port of the pressure sensor 82 (FIG. 3), the viewing port looking downwards, and being a small aperture in the range of a millimeter to a few millimeters. Also shown (FIG. 2) are the two pingers 72 and 74 located on the top 76 of the vehicle 22.

Four proximity sensors 122, 122A, 124 and 124A are carried by the vehicle 22. The proximity sensors 122 and 124 are arranged on opposite front corners of the vehicle 22 and depend from the overhang 120 for viewing the floor 30 and the space immediately above the floor 30 to detect the presence of any abutments in the floor 30, particularly an abutment 126 between two plates 126 and 130 (to be described with reference to FIG. 8). The proximity sensors 122A and 124A are mounted in corresponding fashion on opposite rear corners of the vehicle 22, as shown in FIGS. 3 and 3A, for viewing abutments in the floor 30. In order to respond to the presence of an abutment, such as the abutment 126 between two iron plates 128 and 130, the proximity sensors 122, 122A, 124 and 124A operate by means of a sensing of eddy currents within the iron plates. This is accomplished, in accordance with well-known technology, by providing each of the proximity sensors 122, 122A, 124 and 124A with a coil of wire (not shown). In each pair of proximity transducers, namely the front pair 122 and 124 and the rear pair 122A and 124A, one of the coils is connected to an excitation circuit (not shown, but carried by the vehicle 22) which excites the coil with an alternating current to produce an alternating magnetic field which induces eddy currents within the iron plates 128 and 130. The other of the proximity sensors is provided with a receiving circuit (not shown, but carried by the vehicle 22) connected to its coil for sensing, an alternating magnetic field produced by the eddy currents in the iron plates 128 and 130.

For example, the proximity sensor 122 may be the transmitter of the magnetic field, while the proximity sensor 124 may be the receiver of the magnetic field. The intensity of the received magnetic field varies in accordance with the proximity of the sensors 122 and 124 to the iron of the plates 128 and 130. At the abutment 126, a sudden change in the proximity results with movement of the vehicle 22 towards the abutment 126, this resulting in a change in magnitude of received magnetic field. The signal received at the proximity sensor 124 is communicated via the telemetry 32 (FIG. 1) to the computer system 36 for analysis of the received signal to determine the presence of the abutment 126.

In order to avoid submerged objects, such as a pipe or ladder which may be found within the tank 26 (FIG. 1), the vehicle 22 is provided with one or more video cameras, two such cameras 132 (FIGS. 2 and 3) and 132A (FIG. 3A) being employed in the preferred embodiment of the invention. The front camera 132 views space in front of the vehicle 22, the space being lit by lamps 134 and 136. The front video camera 132 is mounted conveniently on the front of the overhang 120, and lamps 134 and 136 illuminate the space to be viewed by the front video camera 132. The lamps 134 and 136 are carried below the overhang 120, and are mounted on the proximity sensors 122 and 124, respectively. In corresponding fashion, rear lamps 134A and 136A are mounted to the back of the vehicle 22 to illuminate the space to be viewed by the rear video camera 132A, also mounted to the bask wall of the vehicle. Images provided by the cameras 132 and 132A are transmitted via the telemetry link 32 to the control station 34 to be viewed on the display 84 (FIG. 1) by personnel at the station 34. The personnel at the station 34 can then have appropriate control over the movement of the vehicle 22, by means of commands entered at the control panel 86, to navigate the vehicle 22 around the obstruction. The tether 38 is secured by a coupling 138 to a pipe 140 (FIG. 3) extending from the back of the vehicle 22 and carrying fiber optic and electrical wire connections between the vehicle 22 and the control station 34. Video electronics 142, which form a part of the camera 132, are indicated diagrammatically in FIG. 3, and interconnect the camera with the telemetry 32, also indicated in block diagrammatic form in FIG. 3. The telemetry 32 is understood to be effected by means of the tether 38.

As shown in FIG. 3, the vehicle 22 carries on its bottom 144 an instrumentation assembly 146 for the measurement of magnetic flux leakage, and also carries a transducer assembly 148 carrying the aforementioned array of ultrasonic transducer probes 96. The arrangement of the probes 96 is shown in FIG. 4 wherein there are two rows of the probes 96, wherein each of the rows has five of the probes 96. The rows of the probes 96 extend in a direction transverse of the vehicle 22, and the rows are offset such that the probes of a second of the rows cover space between the probes of the first of the rows during travel of the vehicle 22. This enables the probes 96 to view a continuous swath transverse to the path of travel of the vehicle 22. By making the length of the assembly 148 approximately 4 inches long, and by construction each of the probes 96 with a viewing region of approximately one-half inch in width, there is a slight overlap between successive scan path of the respective probes 96, thereby to provide for the continuous coverage. The ultrasonic transducer probes 96 are operated in sequential fashion such that one signal is transmitted at a time from the respective ones of the probes 96 via the telemetry link 32 to the central station 34. This permits multiplexing of the signals of the probes 96 on a reduced number of fiber optic channels.

Figure 8:
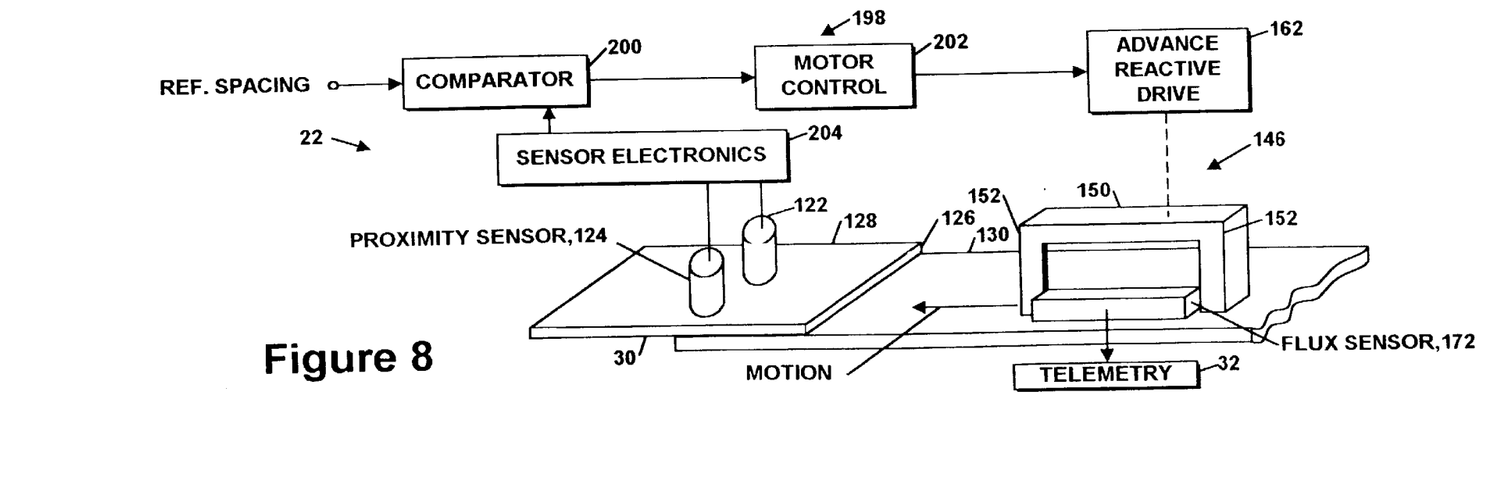
FIG. 8 shows, diagrammatically, an implementation of a drive for advancing and retracting the flux leakage measurement assembly within the well of FIG. 5.

Each of the ultrasonic transducer probes 96, while being indicated diagrammatically in FIGS. 3 and 4, is understood to comprise a piezoelectric material with electronic circuitry for energizing the material and for converting received sound to electronic signals. The electronic signals, which represent echoes received from inner and outer surfaces of the tank floor 30, are communicated by the telemetry link 32 to the control station 34. In the operation of the vehicle 22, the transducer assembly 148 is carried above the floor 30 with a gap to provide a clearance spacing sufficient to clear the abutment 126 (FIG. 8).

Figure 5:
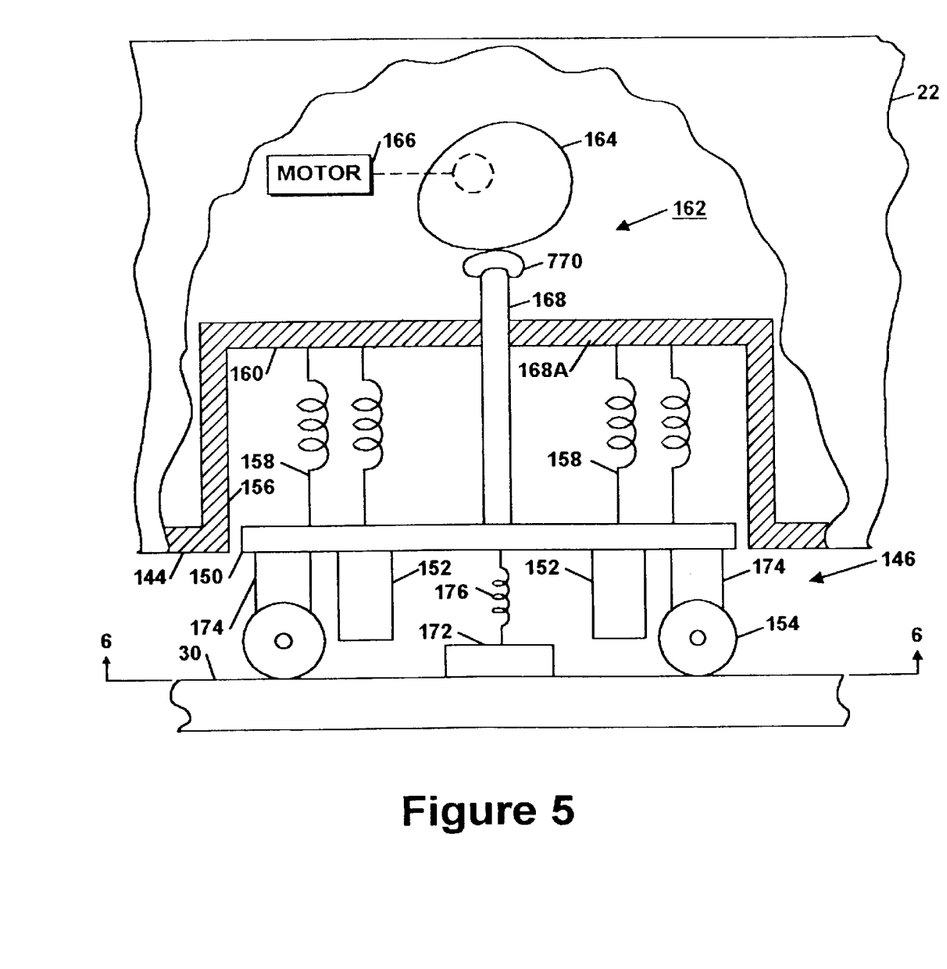
FIG. 5 is a stylized view, partially cutaway, showing a magnetic flux leakage measurement assembly disposed by springs within a well at the bottom of a body of the vehicle of FIG. 3.
Figure 6:
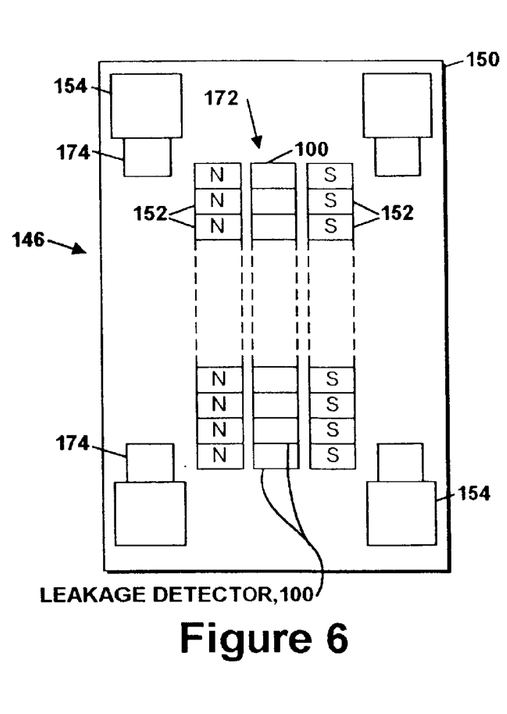
FIG. 6 is a stylized plan view of the magnetic flux leakage measurement assembly taken along the line 6—6 in FIG. 5.

With reference to FIGS. 3, 5, and 6, the instrumentation assembly 146 for the measurement of the magnetic flux leakage comprises, as shown in diagrammatic representation, an iron support 150 carrying two rows of magnets 152 depending from the support 150 toward the floor 30. The magnets 152 are spaced apart from the floor 30 by a clearance gap during operation of the instrumentation assembly 146. The support 150 is configured as a square plate and has wheels 154 located at approximately the four corners of the support 150 to allow the support 150 to be carried along the floor 30 at a fixed distance from the floor 30. The instrumentation assembly 146 is located within a well 156 in the bottom 144 of the vehicle 22, and is supported within the well 156 on a set of springs 158 which secure the support 150 to a roof 160 of the well 156.

An advance-retract drive 162 (also shown in FIG. 8) provides for advancement of the instrumentation assembly 146. In a direction downwardly towards the floor 30, and for retraction of the instrumentation assembly 146 away from the floor 30. The drive 162 includes a cam 164 driven by a motor 166. A rod 168 connects between the support 150 and a cam follower 170 which rides along the cam 164. Rotation of the cam 164 in the forward direction pushes the rod 168 and the entire instrumentation assembly 146 against the force of the springs 158 towards the floor 30. Rotation of the cam 164 in the reverse direction allows the springs 158 to raise the instrumentation assembly 146 away from the floor 30. Apparatus for advancement and retraction of magnetic flux leakage instrumentation is disclosed in two United States patents, namely Maxfield et al U.S. Pat. No. 5,514,956, and Maxfield et al U.S. Pat. No. 5,614,825.

The array of flux leakage detectors 100 act collectively as a sensor 172 of a pattern of magnetic flux leakage in the immediate vicinity of the floor 30. The sensor 172 is positioned between the two rows of the magnets 152 wherein one of the magnet rows is located forward of the sensor 172 and the second of the magnet rows is located behind the sensor 172, with reference to the forward direction of travel of the vehicle 22. The wheels 154 connect via posts 174 to the support 150, the lengths of the posts 174 being sufficient to provide for spacing between the support 150 and the floor 30 for accommodating each of the magnets 152. In the forward row of the magnets 152, each of the magnets 152 has a north pole facing the floor 30 and a south pole facing the support 150. In the back row of the magnets 152, each of the magnets 152 has a south pole facing the floor 30 and a north pole facing the support 150. Since the support 150 is made of iron and is permeable to the magnetic flux of the magnets 152, each of the magnets 152 of the forward row and the corresponding magnet 152 of the back row cooperate with the support 150 to provide the configuration of the C-shaped magnet for driving magnetic flux into the iron plates of the floor 30. Thus, with respect to each of the C-shaped magnets, the path of flux passes primarily through the floor 30 with some leakage in the immediate vicinity of the floor 30, the leakage being found at the locations of the respective ones of the leakage detectors 100 of the sensor 172.

The sensor 172 is positioned relative to the support 150 by a set of springs 176, one such spring being indicated diagrammatically in FIG. 5. Upon advancement of the support 150 to bring the wheels 154 into contact with the floor 30, the springs 176 allows the sensor 172 to make light contact with the floor 30 so as to permit the sensor 172 to slide along the surface of the floor during movement of the vehicle 22. Thereby, the sensor 172 is able to sense the patterns of the magnetic flux leakage in the immediate vicinity of the floor 30. Upon retraction of the support 150 by the drive 162, the wheels 154 and the sensor 172 lift away from the floor 30 so that, during stowage of the sensor 172 within the well 156, there is sufficient clearance for an obstacle, such as the abutment 126 (FIG. 8). The clearance is sufficient to allow the wheels 154, the magnets 152, and the sensor 172 to pass over the abutment 126 without striking the abutment 126.

It is noted that the use of the well 156 in the bottom 144 of the vehicle 22 enables the components of the instrumentation assembly 146 to be carried outside of the vehicle 22. Thereby, there is only one element, namely the rod 168 which penetrates through the bottom 144 via an aperture 168A in the roof 160 of the well 156. This permits the interior of the vehicle 22 to be sealed off from the external environment, thereby to avoid a hazard of ignition of flammable fields. Also, the transducer assembly 148 of the ultrasonic transducer probes 96 has the form of a continuous plate in the bottom 144 of the vehicle 22 for sealing the vehicle 22 against ingress of flammable vapors. Thereby, the construction of the sensors carried by the vehicle 22 allows the vehicle 22 to be sealed off from ingress of flammable vapors.

Figure 7:
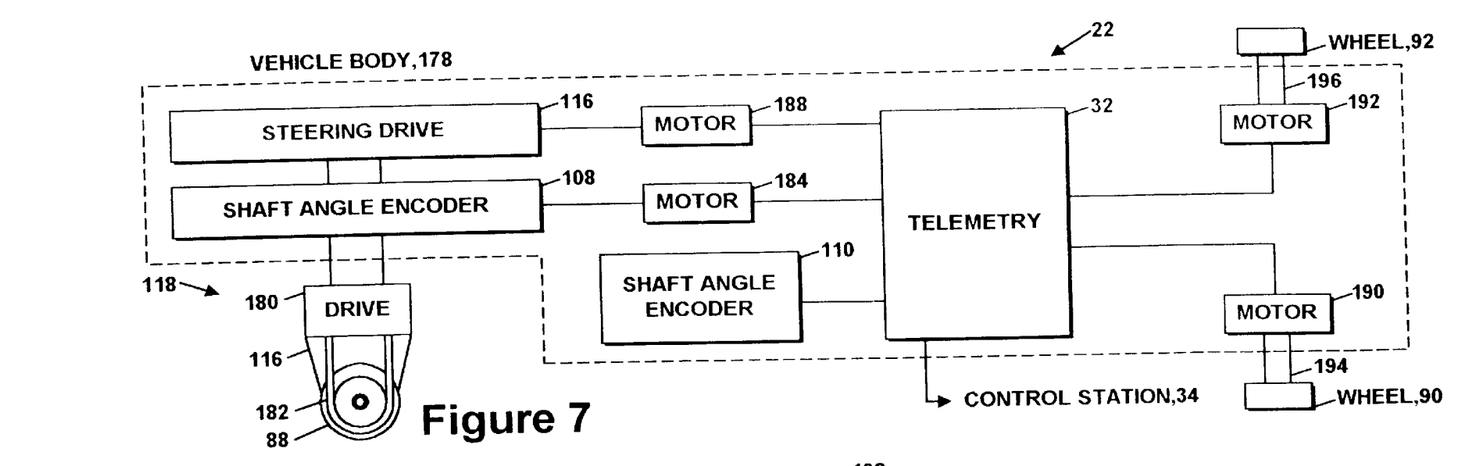
FIG. 7 is a block diagram showing interconnections of shaft-angle encoders with a steering wheel of the vehicle.

With reference to FIG. 7, the steering mechanism 118 is located partially outside and partially within the body 178 of the vehicle 22. Mounted coaxial to the steering mechanism 118 is a drive 180 which imparts rotation to the front driving wheel 88 via a chain 182. The drive 180 and the bracket 116 are fixed mechanically to each other so as to permit rotation of the front wheel 88 concurrently with a turning of the front wheel 88 about the vertical steering axis. The drive 180 is powered by a motor 184 wherein an output shaft of the motor 184 connects with the shaft angle encoder 110. Thereby, incremental changes in the rotational orientation of the front wheel 88 can be noted and transmitted via the telemetry 32 to the control station 34. The angle encoding is sufficiently fine so as to transmit 30 steps of increment per inch of travel of the front wheel 88 on the tank floor 30 (FIG. 1). The steering mechanism 118 includes a steering drive 186 by which power of a motor 188 is employed to effect a turning of the wheel 88 about the steering axis. The shaft angle encoder 108 is mechanically connected to the steering drive 116 to sense incremental changes in the orientation of the front wheel 88 about its steering axis. Thereby, the encoder 108 is able to transmit steering position via the telemetry 32 to the control station 34.

Energization of the motors 184 and 188 is accomplished in response to commands transmitted from he control station 34 via the telemetry 32. Further motors 190 and 192, located within the vehicle body 178, connect via shafts 194 and 196, respectively, to the rear driving wheels 90 and 92. Energization of the motors 192 and 190 is accomplished also in response to command signals transmitted from the control station 34 via the telemetry 32. Thereby, movement of the vehicle 22 can be controlled both in terms of forward and reverse motion, as well as in terms of a steering of the vehicle 22, this being accomplished with full knowledge of displacement of the vehicle and direction of travel of the vehicle from a starting point.

FIG. 8 demonstrates the operation of the advance-retract drive 162 in raising and lowering the instrumentation assembly 146 previously described in FIG. 5, during forward motion of the vehicle, in accordance with signals received with the aid of the front proximity sensors 122 and 124 upon an approach of the vehicle 22 to the abutment 126 between the floor plates 128 and 130. While FIG. 8 shows operation of the vehicle 22 during forward motion, it is to be understood that the same principles of operation apply during a backing-up motion of the vehicle 22 in accordance with signals received with the aid of the rear proximity sensors 122A and 124A. The advance-retract drive 162 operates with a control system 198 comprising a comparator 200, a motor control circuit 202, and sensor electronics 204 for operation with the proximity sensors 122 and 124. Movement of the vehicle 22 with its instrumentation assembly 146 and proximity sensors 122 and 24 relative to the plates 128 and 130 is indicated by an arrow.

In operation, the sensor electronics 204 activates the proximity sensor 122 to apply an alternating magnetic field to the plate 128. This induces eddy currents within the plate 182, a resulting magnetic field from the eddy currents being received at the proximity sensor 124. An electrical signal representing the received field is applied via the proximity sensor 124 to the sensor electronics 204. The sensor electronics 204 outputs to the comparator 200 a signal representing the strength of the sensed eddy current magnetic field. The floor 30 is closer to the proximity sensors 124 and 122 as movement of the vehicle 22 places the proximity sensors 122 and 124 to the left of the abutment 126. The spacing between the proximity sensors 122 and 124 and the floor 30 is larger when the proximity sensors 122 and 124 are to the right of the abutment 126. The amount of magnetic field coupled into the plate 128 by the sensor 122 and the resulting eddy currents are greater than the corresponding field and eddy current coupled into the plate 130 due to the difference in spacing between the plates 128 and 130 and the sensors 122 and 124.

As a result, the signal applied by the sensor electronics 204 to the comparator 200 differs in accordance with the location of the sensors 122 and 124 relative to the abutment 126. A reference spacing is also applied as an input signal to the comparator 200. By comparing the signal of the sensor electronics 204 to a reference spacing, the comparator 200 outputs a signal to the motor control circuit 202 to activate the motor 166 (FIG. 5) of the drive 162 to raise the instrumentation assembly 146 as the assembly 146 approaches the abutment 126. After the vehicle 22 has fully cleared the abutment 126, operating personnel at the control station 34 may direct the advancement of the instrumentation assembly 145 back towards the point 128. Also shown in FIG. 8 are components of the instrumentation assembly 146, namely the C-shaped configuration of a magnet comprising the two magnets 152 joined by a section of the support 150. The flux sensor 172 is shown between the magnets 152, with circuitry of the flux sensor 172 being connected via the telemetry link 32 to communicate with the control station 34.

Figure 9:
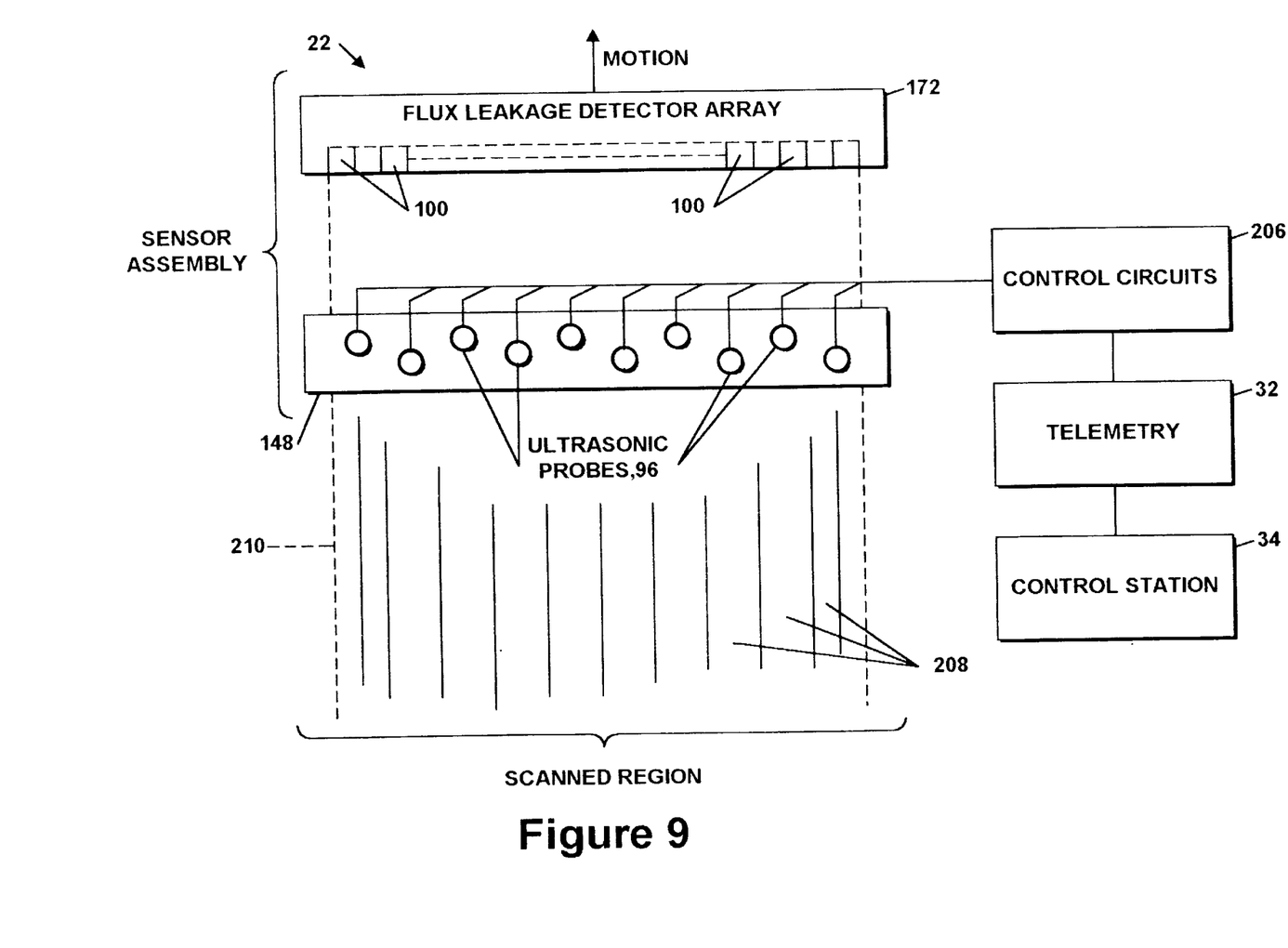
FIG. 9 shows, diagrammatically, operation of an electromagnetic sensor with an array of ultrasonic probes for scanning a region of the floor of the tank of FIG. 1.

In FIG. 9, the detectors 100 and the flux leakage detector array of the sensor 172 connect via control circuits 206 and the telemetry link 32 to the control station 34. Also, the ultrasonic probes 96 connect with the control circuits 206, and via the telemetry link 32, to the control station 34. In the preferred embodiment of the invention, each of the magnetic flux leakage detectors 100 comprises a Hall-effect transducer. Alternatively, if desired, each of the detectors 100 may be constructed as a passive coil which links the leaked magnetic flux. Upon movement of the vehicle 22 in the direction of the arrow, the coils of the detectors 100 move through the flux fields, and, in the event that there is a change in intensity of magnetic flux, produce a signal which is outputted to the control circuits 206. In the array of the detectors 100 in the preferred embodiment of the invention, there are 16 of the detectors 100, and the length of the array is 3.2 inches. Each of the detectors 100 has a cross-section of approximately 0.125 inch.

By way of still further embodiment, it is noted that pairs of the detectors 100 can be operated for eddy current sensing, analogous to the operation of the proximity sensors 122 and 124 (FIG. 8), and operating at a frequency less than approximately 500 hertz which insures that their magnetic fields fully extend between front and back surfaces of the plates. These alternating magnetic fields are applied in addition to the fixed magnetic fields of the magnets 152 (FIG. 8). Changes in thickness of the floor plate, such as the plate 130 of FIG. 8, result in a change of value of sensed magnetic field. With all three of these embodiments, a defect in a part of the enclosing wall 26 of the tank 26, such as in the plate 130, reduces the volume of iron of the plate 130 for a coupling of magnetic flux. This has the effect of decreasing the intensity of flux sensed by a detector 100. The control circuits 206 provide required electrical excitation for each of the detectors 100 and also for the ultrasonic probes 96. Also included within the control circuits 206 are any necessary transmitters of electronic signals and receivers of electronic signals generated by a detector 100 or probe 96 in response to inspection of the tank floor 30 (FIG. 8).

Also shown in FIG. 9 are linear regions 208 scanned by respective ones of the ultrasonic probes 96 during movement of the vehicle 22. A region 210 swept by the flux sensor 172 is indicated by dashed lines, and encloses the array of the linear regions 208 scanned by the probes 96. Thus, FIG. 9 demonstrates how the presence of a defect in the floor 30 is reported by the flux sensor 172, this being followed by an examination of the physical shape of the defect by the probes 96.

Figure 10:
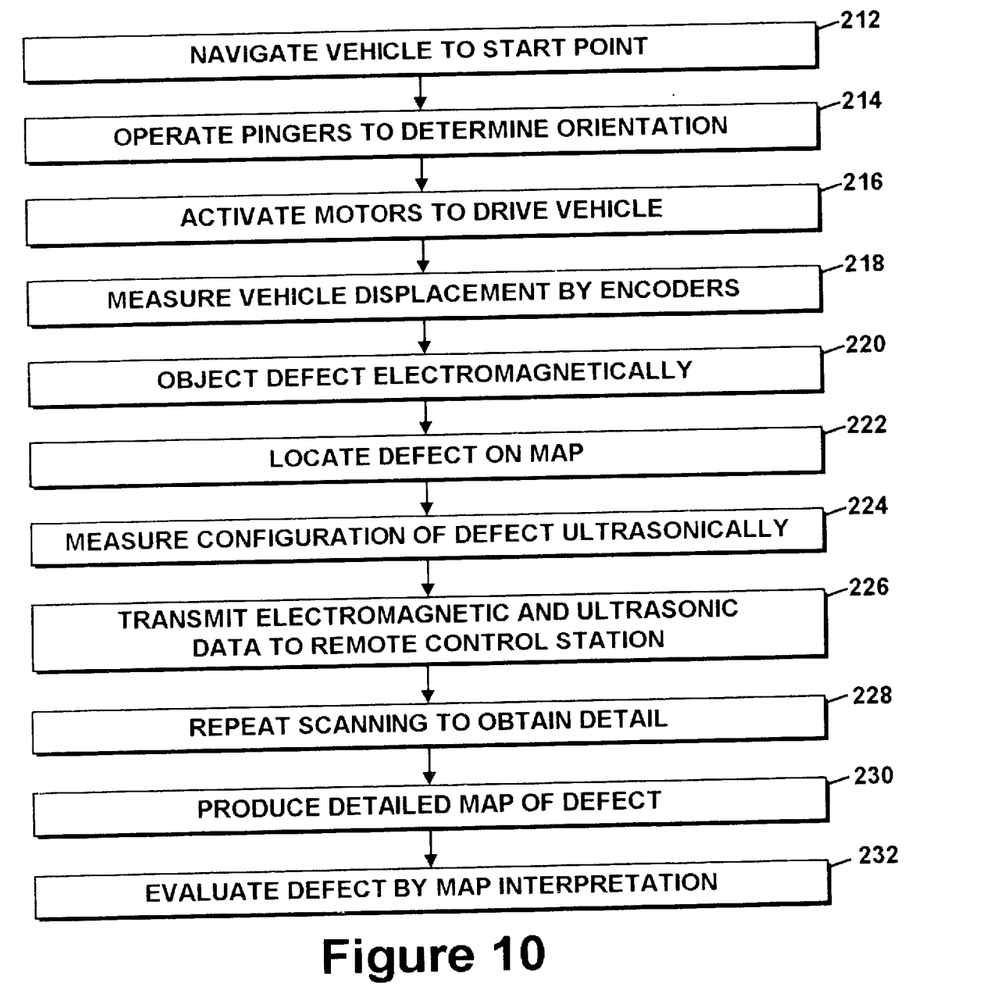
FIG. 10 is a flow chart showing steps in the operation of the tank inspection system including a computer system at a central station employed in the inspection of the tank.

With reference to FIG. 10, a methodology in the practice of the invention begins with an emplacement of the vehicle 22 in the tank 26 of FIG. 1. Thereupon, the vehicle is navigated with the aid of the navigation computer 106 and the ultrasonic receivers 68. The vehicle is to be navigated to the start point of an inspection scanning procedure as noted at block 212 of FIG. 10. Thereupon, as noted in block 214, the pingers 72 and 74 are operated sequentially in conjunction with the navigation computer 106 to determine the relative locations of the pingers and, accordingly, the orientation of the vehicle 22. Scanning can now begin, and as noted at block 216, there is an activation of the drive motors 184, 190 and 192 (FIG. 7) to initiate a scanning movement of the vehicle 22.

During a traveling of the vehicle 22 along a scanning path, the displacement of the vehicle 22 from the start point is measured by dead reckoning employing signals of the shaft angle encoders 108 and 110 (FIG. 7), as noted at block 218. Concurrently with the moving of the vehicle 22 along the scanning path, as noted at block 220, the flux sensor 172 (FIGS. 5, 6, and 8) is employed to sense anomalies in an electromagnetic field, such as the flux leakage detection by the Hall-effect transducers. This information is transmitted via the telemetry link 32 to the control station 34 to be observed by personnel at the station. Then, as noted in block 222, by observation of the sensed electromagnetic field, the appearance of an anomaly in the field serves to locate a defect on a map of the tank floor.

Upon the identification and location of a defect, the scanning procedure continues, at block 224, with a measurement of the detailed configuration of the defect. This is accomplished ultrasonically by use of the transducer assembly 148 (FIGS. 3, 4, and 9). Successive passes of the vehicle 22 may be made across the defective area from different directions of travel. Both the data which has been gathered electromagnetically and the data which has been gathered ultrasonically are transmitted, at block 226, to the remote control station for evaluation. In particular, the detailed data of a floor plate which is provided by each of the ultrasonic transducer probes 96 provides for detail in an image of the defect.

Sets of data from different scanning passes of the vehicle 22 may be combined with any one of a number of well-known algorithms for statistical analysis of data by the data integration computer 102 (FIG. 1) which appropriately dispositions deviations in the data between one pass and the next pass. Correlation of the series of images is accomplished accurately in view of the fine displacement data provided by the encoders 108 and 110 located respectively in the steering drive and in the the drive for rotation of the front wheel 88 (FIG. 7). Further understanding of the mapping of the defective area is enhanced by use of a map of the anomaly in the field of magnetic flux leakage provided by the instrumentation assembly 146 (FIGS. 3, 5, and 6). The steps of repeating the scanning to obtain the detail is shown at block 228, the step of producing the detailed map of the defect is shown at block 230, and the evaluation of the defect by interpretation of the map is shown at block 232.

Figure 11:
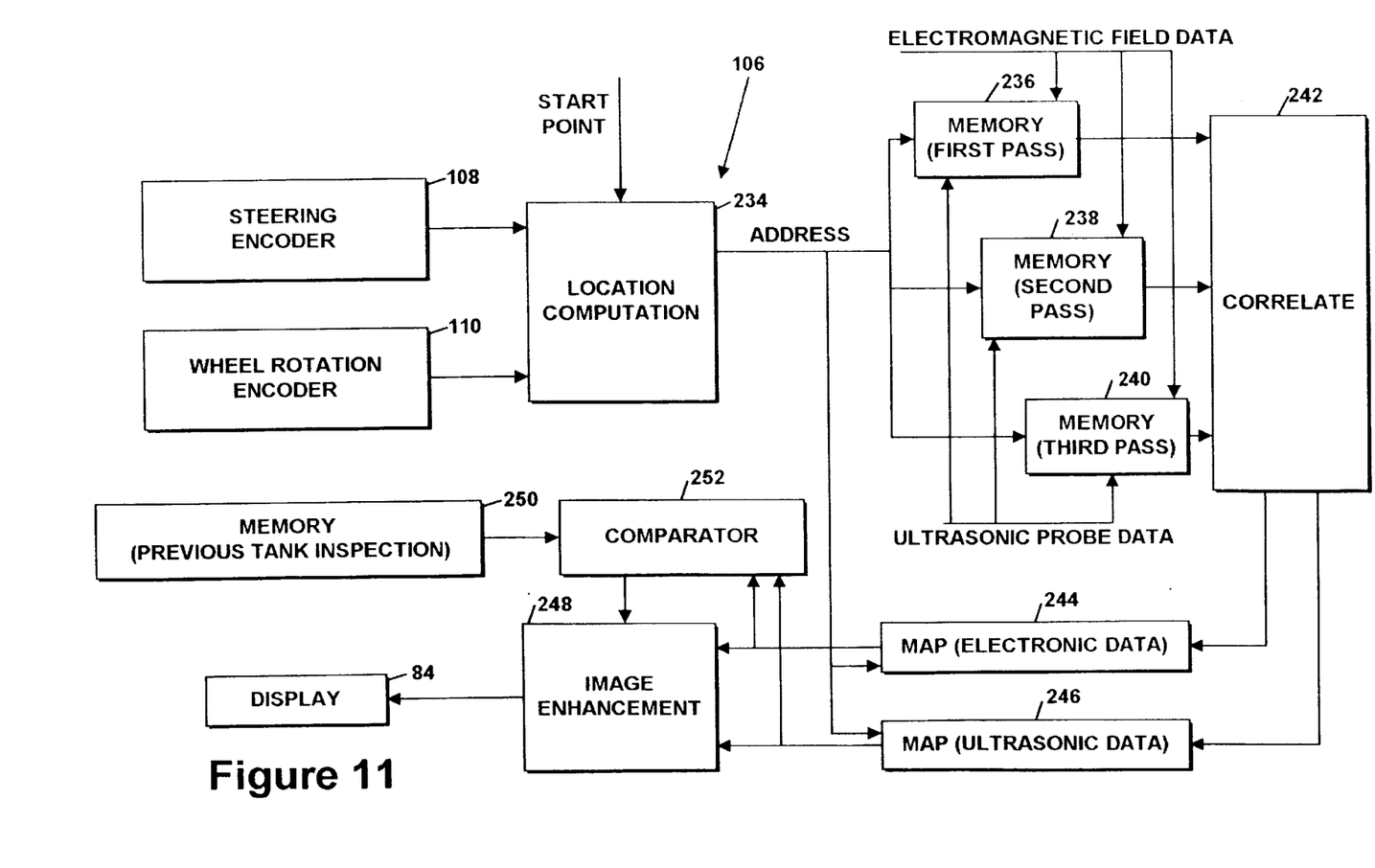
FIG. 11 is a block diagram of circuitry employed in mapping data.

In FIG. 11, the viewing angle data provided by the shaft angle encoder 108 and the wheel rotation data of the shaft angle encoder 110 (FIG. 7) are applied to a location computation unit 234, the computation unit 234 being, a part of the navigation computer 106 (FIG. 1). The start point of a scanning of the vehicle 22, as calculated by the navigation computer 106 is also applied to the computation unit 234. The computation unit 234 outputs the location of the vehicle 22, the location being continually updated with each new input signal provided by the encoders 108 and 110. Also included in FIG. 11 are three memories 236, 238 and 240 which may be a part of the memory 64 (FIG. 1), and a correlator 242. The location signal outputted by the computation unit 234 is employed as an address for each of the memories 236, 238, and 240. Each of the memories 236, 238 and 240 store both data obtained from electromagnetic field sensing, as by the sensor 172 (FIGS. 5, 6, 8 and 9), and ultrasonic data obtained from the transducer probes 96 (FIGS. 3 and 4).

The memories 236, 238 and 240 serve respectively for storing data of a defective area of the floor 30 (FIG. 1) during a first scanning pass, a second scanning pass, and a third scanning pass of the vehicle 22 over the defective area. Three memories for three scanning passes are shown, by way of example, it being understood that additional memory for further scanning passes may be employed. Data stored at a common address in each of the memories 236, 238 and 240 are outputted to the correlator 242 to obtain a statistically meaningful value of data at each location of the vehicle 22. By use of the already known layout of the instruments carried by the vehicle 22, the locations of the front and the back pingers 72 and 74 (FIGS. 1 and 2) may be employed for designating the exact location of the start point for any one of the instruments, such as the transducer assembly 148 (FIG. 3), carried by the vehicle 22. The correlated value of each data point is then stored as a map wherein the electromagnetic field data is stored in a map 244 and the ultrasonically obtained data is stored in a map 246. The locations of the data points are applied by the computation unit 234 to the maps 244 and 246 along with the data from the correlator 242. Further enhancement of the map 246 of the ultrasonic data can be obtained by image enhancement unit 248 which is a part of the data integration computer 102 (FIG. 1). This is accomplished by weighting data of the map 246 by use of the electromagnetically obtained data of the map 244.

Furthermore, the computer system 36 of FIG. 1 includes a memory 250 and a comparator 252, shown in FIG. 11, which enable comparison of the results of the present inspection of the tank 26 with the results of a previous inspection, such as an inspection performed a few years prior to the present inspection. The results of the prior inspection are presented by way of a prior maps of the tank floor 30, stored in the memory 250, and are compared with the present maps 244 and 246 by the comparator 252. The comparator 252 enables alignment of the present maps with the prior maps to null out any discrepancies such as a slight offset in orientation or position. The image enhancement unit 248 applies these maps and their differences to the display 84 for analysis by personnel at the control station 34. Thereby, maps of both the electromagnetically obtained data and the ultrasonically obtained data can be compared by personnel at the control station 34 (FIG. 1), and both sets of data can be used to provide an enhanced image of a defect in the tank floor 30.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A tank inspection system comprising:
   a submersible vehicle adapted for crawling along an internal surface of a tank, and a control station remote from the tank for controlling operation of the vehicle, the vehicle serving as a mobile platform for supporting instruments for measurement of an enclosing wall of the tank;
   a telemetry link for communication of data and commands between said vehicle and said station, a portion of said telemetry link comprising a tether connecting to said vehicle, said tether serving for lowering said vehicle into the tank and for raising said vehicle out of the tank;
   a computer means in said station coupled via said telemetry link to said vehicle, said computer means being operative to form a map of the surface of the tank based on information communicated from said vehicle via said telemetry link;
   an electromagnetic sensor carried by said vehicle for measuring an electromagnetic field in a region of said internal surface under observation, an amount of said field being representative of a thickness of a magnetically conductive plate of said enclosing wall to provide a field representation with a field anomaly being indicative of an image of said wall, a magnitude of said field constituting a first portion of said information;
   an ultrasonic sensor carried by said vehicle for measuring sonic echoes in the region of said internal surface under observation to provide sonic data, a delay in propagation time between transmission and reception of a sonic signal of said ultrasonic sensor being representative of a thickness of said plate of said enclosing wall to provide a relatively fine resolution of an image of said wall at the location of said electromagnetic field anomaly, said propagation delay constituting a second portion of said information; and
   drive means in said vehicle operative in response to control signals from said computer means to provide a scanning movement of said vehicle for viewing portions of said observation region to obtain sonic data for the fine resolution of the image.

2. A system according to claim 1 wherein said enclosing wall of the tank includes a floor of the tank, and said electromagnetic sensor comprises an array of Hall-effect transducers and a magnet for impressing a magnetic flux in a plate of the tank floor, said array of Hall-effect transducers sensing a flux field resulting from the presence of the floor plate.

3. A system according to claim 1 wherein said ultrasonic sensor comprises an array of probes, said array extending transversely of a path of travel of the vehicle to obtain sonic data.

4. A system according to claim 1 wherein said map is a first map, said computer means includes a memory for storing a plurality of maps including said first map, said maps being prepared at different times, said computer means being operative to correlate said first map with another of said maps to determine degradation of said enclosing wall.

5. A system according to claim 1 further comprising a video camera for observation of an obstruction, images of the video camera being transmitted via said telemetry link to personnel at said station enabling the personnel to direct said drive means to avoid said obstruction.

6. A system according to claim 1 wherein said enclosing wall includes a floor of the tank, said vehicle crawls along said floor, and said system further comprises a depth sensing means carried by said vehicle, said depth sensing means being operative to provide a succession of depth measurements at a corresponding succession of locations of said vehicle wherein depth is measured from a planar surface of liquid in the tank to said vehicle on the floor of the tank, depth measurements being transmitted via said telemetry link to said computer means; and
   said electromagnetic sensor and said ultrasonic sensor are activated by said computer means upon a signaling by said depth sensing means of a nonzero value of depth, the nonzero value of depth indicating submersion of said vehicle by said liquid to guard against ingress of a flammable vapor of the liquid into said vehicle.

7. A system according to claim 1 wherein said enclosing wall includes a floor of the tank, said vehicle crawls along, said floor, and said system further comprises a depth sensing means carried by said vehicle, said depth sensing means being operative to provide a succession of depth measurements at a corresponding succession of locations of said vehicle wherein depth is measured from a planar surface of liquid in the tank to said vehicle on the floor of the tank, depth measurements being transmitted via said telemetry link to said computer means; and
   wherein said computer means includes a memory for storing a succession of said depth measurements and is operative to determine a variation from a planar form in said floor, such a variation constituting a settling of said floor.

8. A system according to claim 7 further comprising a pinger located on said vehicle, and an array of acoustic receivers mounted in a spaced-apart array on said enclosing wall, wherein said pingers and said acoustic receivers connect via said telemetry link to said computer means to provide a navigation function providing a succession of locations of said vehicle, said succession of vehicle locations including the location of said settling of said floor.

9. A system according to claim 1 wherein said enclosing wall includes a floor of the tank, said vehicle crawls along said floor, said electromagnetic sensor includes a magnet, and said system further comprises positioning means for positioning said magnet adjacent said floor with a clearance cap between said magnet and said floor, said floor comprising a plurality of plates with overlapping edges forming step abutments; and wherein said system further comprises a proximity sensor carried on said vehicle for signaling proximity of one of said step abutments to said positioning means, and said positioning means is responsive to a signal of said proximity sensor to retract said magnet from said floor to clear said one step abutment upon a signaling of the presence of said one step abutment by said proximity sensor.

10. A system according to claim 1 wherein said vehicle has a front and a back, said drive means comprises three wheels and a steering mechanism, two of said wheels being disposed at the back of said vehicle, and a third of said wheels being located in the front of said vehicle, said third wheel connecting with said steering mechanism for steering said vehicle; and wherein the system further comprises a shaft angle encoder operatively coupled to one of said wheels for measuring rotational angle of said one wheel to determine a displacement of said vehicle, and a steering angle encoder for signaling an orientation of said third wheel, said shaft angle encoder and said steering, angle encoder transmitting their respective angle data to said computer means, said computer means being operative to employ said angle data for determining position and course of said vehicle during said scanning movement.

11. A system according to claim 10 wherein said scanning movement comprises a back-up movement.

12. A system according to claim 1 further comprising a first pinger located on said vehicle at a first location, a second pinger located on said vehicle at a second location distant from said first location, and an array of acoustic receivers mounted in a spaced-apart array on said enclosing wall, wherein said pingers and said acoustic receivers connect via said telemetry link to said computer means, said computer means being operative to activate said pingers to emit their respective sounds, said computer means being responsive to times of receipt of the respective sounds at each of said acoustic receivers for calculating location and orientation of the vehicle within the tank, thereby to enable a navigation of said vehicle within the tank.

13. A system according to claim 12 wherein said vehicle has a front and a back, said drive means comprises three wheels and a steering mechanism, two of said wheels being disposed at the back of said vehicle, and a third of said wheels being located in the front of said vehicle, said third wheel connecting with said steering mechanism for steering said vehicle; and wherein the system further comprises a shaft angle encoder operatively coupled to one of said wheels for measuring rotational angle of said one wheel to determine a displacement of said vehicle, and a steering angle encoder for signaling an orientation of said third wheel, said shaft angle encoder and said steering angle encoder transmitting their respective angle data to said computer means, said computer means being operative to employ said angle data for determining position and course of said vehicle in a dead reckoning process for increased accuracy to said navigation of said vehicle within the tank.

14. A system according to claim 1 wherein said electromagnetic sensor includes means for positioning said electromagnetic sensor adjacent said wall with a clearance gap between said electromagnetic sensor and said wall;

said vehicle comprises an enclosing body, an exterior of said body having a well with an opening at a bottom of the body, said electromagnetic sensor being disposed within said well, retraction of said electromagnetic sensor by said positioning means being accomplished by a retraction into said well; and said positioning means comprises a motorized drive located within said body, and a rod passing through an aperture in a roof of said well to connect from said motorized drive to said electromagnetic sensor for establishing a position of said electromagnetic sensor relative to said vehicle body, said roof forming a seal with said rod at said aperture to minimize ingress into said vehicle body of liquid contained in said tank and ingress into said body of flammable vapor of said liquid.

* * * * *